E. C. SHEUFFEL.
HORSESHOE.
APPLICATION FILED SEPT. 25, 1911.
1,034,842.
Patented Aug. 6, 1912.
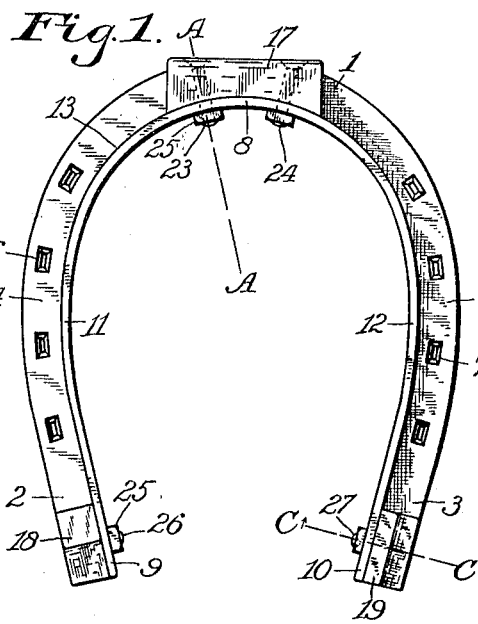
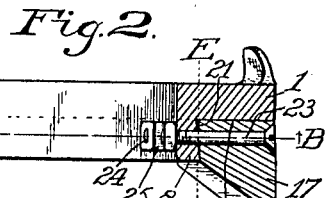
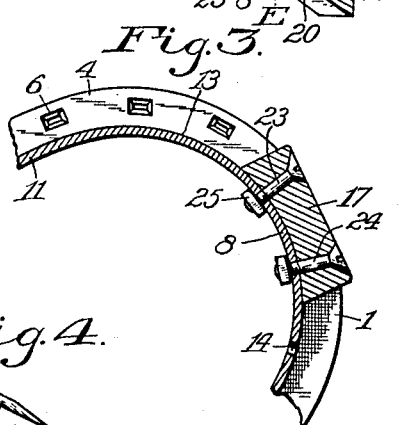
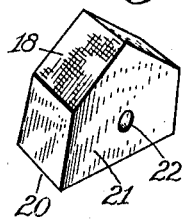
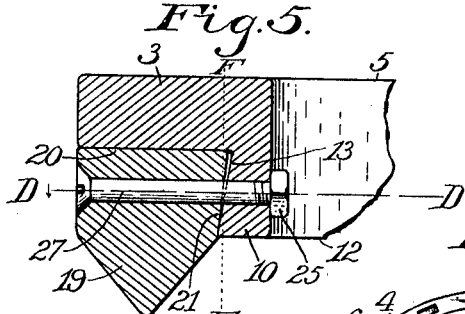
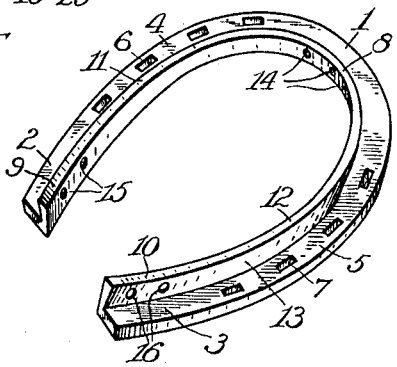
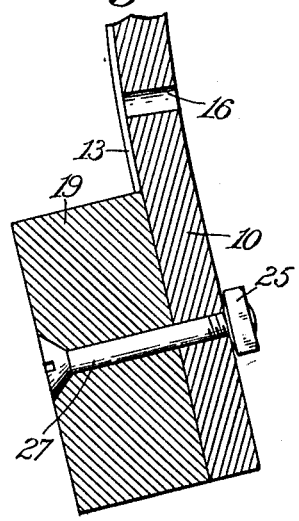
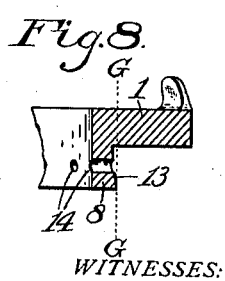
WITNESSES:
J. H. Gardner
G. W. Poyner
INVENTOR:
Ernest C. Sheuffel,
BY
E. T. Silvius,
ATTORNEY.
COLUMBIA PLANOGRAPH CO., WASHINGTON, D. C.

UNITED STATES PATENT OFFICE.

ERNEST C. SHEUFFEL, OF INDIANAPOLIS, INDIANA.

HORSESHOE.

1,034,842.  Specification of Letters Patent.  Patented Aug. 6, 1912.

Application filed September 25, 1911. Serial No. 651,037.

*To all whom it may concern:*

Be it known that I, ERNEST C. SHEUFFEL, a citizen of the United States, residing at Indianapolis, in the county of Marion and State of Indiana, have invented a new and useful Horseshoe, of which the following is a specification, reference being had to the accompanying drawings and to the letters and figures of reference marked thereon.

This invention relates to metallic shoes for horses, mules or the like, the invention having reference more particularly to shoes having removable calks.

The object of the invention is to provide an improved horseshoe and removable calks therefor so constructed and combined as to permit any one without special tools to remove or replace the calks expeditiously and without requiring that the animal be taken to a shop; a further object being to provide an improved shoe which shall be adapted to be used in emergency without the calks and which shall be so constructed that it may be readily nailed to the hoof of the animal without other tools than the ordinary horseshoer's hammer. And a still further object is to provide an improved horseshoe having the above mentioned advantages and which shall not be liable to pick up and carry pebbles or other matter from the roads.

With the above mentioned and minor objects in view, the invention consists in certain novel features of construction in shoes of the above mentioned character, and in the parts and combinations and arrangements of parts as hereinafter particularly described and claimed.

Referring to the drawings, Figure 1 is a bottom plan view of a horseshoe constructed substantially in accordance with the invention; Fig. 2, a fragmentary section on the line A A in Fig. 1 inverted; Fig. 3, a fragmentary section on the line B B in Fig. 2 inverted; Fig. 6, a perspective view of the of the improved heel calks; Fig. 5, a fragmentary section on the line C C in Fig. 1 inverted; Fig. 6, a perspective view of the improved shoe without the calks; Fig. 7, a fragmentary section on the line D D in Fig. 5; and Fig. 8, a section similar to Fig. 2 but without the toe calk.

Similar reference characters in the different figures of the drawings indicate like parts or features of construction herein referred to.

The improved shoe is adapted to be made of rolled L-section iron or steel cut off to suitable length and curved to the required contour of the hoof of the animal. Each shoe comprises a foundation plate of which the toe portion is indicated by the numeral 1, the heel portions by the numerals 2 and 3, and the intermediate portions by the numerals 4 and 5, the plate being flat and somewhat thinner than the ordinary horseshoe. The intermediate portions have nail holes 6 and 7 therein to receive securing nails. The toe portion of the plate has a flange 8 thereon and the heel portions have flanges 9 and 10 thereon respectively, and the intermediate portions preferably have flanges 11 and 12 thereon formed continuously with the other flanges, the flanges or the continuous flange extending from the inner edge portion of the plate and downwardly or forwardly so as to support the animal in the absence of calks. The outer side face 13 of each flange or the continuous flange is acute-angled relative to the plane of the plate; the toe portion flange 8 has a suitable number of holes 14, preferably three, to receive securing bolts, and the heel portion flange 9 has a suitable number of holes 15, the other heel portion flange 10 having also a suitable number of holes 16 to receive securing bolts. Preferably one hole is made use of for each heel calk and another hole is made use of in case it be desired to shift the position of the calk; and likewise either two of the adjacent holes in the toe portion flange may be made use of for securing the toe calk centrally or slightly at one side of the median line of the shoe.

A suitable toe calk 17, either sharpened or blunt, and two heel calks 18 and 19 having suitably shaped ends, are employed, the base 20 of each calk being flat and placed against the under side of the foundation plate, the inner side 21 of each calk that is adjacent the flange being acute-angled relative to the base of the calk, but preferably the angularity is slightly less acute than that of the side face 13 of the flange, so that there is slight clearance between the acute-angled faces adjacent to the bases of the calks, the calks having each a suitable number of bolt holes 22 therein arranged in such position as to be in alinement with the bolt holes in the flanges. Preferably two bolts 23 and 24 provided each with a nut 25 are employed to secure the toe calk 17 to the flange 8, the bolts having flush heads engaging the calk and facing outward and the nuts being placed against the inner side face of the flange, said face preferably being right-angled relative to the plane of the foundation plate. Similar bolts 26 and 27 are employed to secure the heel calks to the flanges 9 and 10 respectively, each bolt having a nut 25 thereon.

It will be understood that the securing bolts and the holes therefor are not machine finished and therefore the bolts may not fit accurately and tightly in the holes, but notwithstanding this, when the bases of the calks are placed against the foundation plate and the nuts then tightened it will be apparent that the acute-angled faces serve to interlock the calk with the flange, so that the calk is securely retained solidly against the foundation plate and can not cause clattering when the animal is in motion. By reference to the dotted lines, E E in Fig. 2, F F in Fig. 5 and G G in Fig. 8, which lines are at right-angles to the plane of the plate, the relative angularity of the interlocking faces is clearly apparent, and it will be observed especially in Fig. 5 that when the bolt is tightened so as to draw the calk against the extremity of the flange, the base 20 of the calk is forced tightly against the foundation plate 3, without the face 21 coming in contact with the face 13 adjacent to the base.

In practical use it is preferable to slightly upset the ends of the bolts after tightening the nuts thereon, and when it is desired to remove the calks or replace them with new ones, the nuts being readily accessible may be readily forced off without removing the shoe from the hoof, and if through carelessness or from any cause the calks are omitted, it will be clear that the animal may freely use the shoe without being disabled, the flanges or the continuous flange supporting the foundation plate.

Having thus described the invention, what is claimed as new, is—

1. A horseshoe comprising a flat curved foundation plate having a curved flange on the inner edge portion thereof, the convexly curved side of the flange being angular relative to the plane of the plate, a calk having a flat base in contact with the plate and extending from the outer edge portion of the plate inward nearly to said flange, the side of the calk that is adjacent the flange having an angle of greater degree than the side of the flange relative to the plate, and a bolt securing said calk to said flange.

2. A horseshoe comprising a flat curved foundation plate having a curved flange on the inner edge portion thereof that is broader at its extremity than at its base, the convexly curved side of the flange being acute-angled relatively to the plane of the plate, calks having flat bases in contact with the plate and extending from the outer edge portion of the plate inward nearly to said flange, the side of each calk that is adjacent the flange being acute-angled to a greater degree than the side of the flange relative to the plate, and bolts securing said calks to said flange.

In testimony whereof, I affix my signature in presence of two witnesses.

ERNEST C. SHEUFFEL.

Witnesses:
  E. T. SILVIUS,
  P. A. HAVELICK.

Copies of this patent may be obtained for five cents each, by addressing the "Commissioner of Patents, Washington, D. C."